United States Patent
Verma et al.

(10) Patent No.: US 8,572,217 B2
(45) Date of Patent: Oct. 29, 2013

(54) METHODS AND APPARATUSES FOR DYNAMICALLY PROVISIONING A DYNAMIC HOST CONFIGURATION PROTOCOL (DHCP) CLIENT AS A CLIENTLESS INTERNET PROTOCOL SERVICES (CLIPS) SUBSCRIBER ON A LAST-RESORT INTERFACE

(75) Inventors: Sanjeev K. Verma, Santa Clara, CA (US); Arunkumar M. Desigan, Santa Clara, CA (US); Ravindra Narayan, Fremont, CA (US)

(73) Assignee: Ericsson AB, Stockholm (SE)

( * ) Notice: Subject to any disclaimer, the term of this patent is extended or adjusted under 35 U.S.C. 154(b) by 705 days.

(21) Appl. No.: 12/032,587

(22) Filed: Feb. 15, 2008

(65) Prior Publication Data
US 2009/0210518 A1 Aug. 20, 2009

(51) Int. Cl.
*H04L 29/06* (2006.01)
(52) U.S. Cl.
USPC ............ 709/220; 709/245; 709/223; 370/392
(58) Field of Classification Search
USPC ........................................................ 709/220
See application file for complete search history.

(56) References Cited

U.S. PATENT DOCUMENTS

| | | | |
|---|---|---|---|
| 6,223,222 B1 | 4/2001 | Fijolek et al. | |
| 6,560,642 B1 * | 5/2003 | Nurmann | 709/220 |
| 6,876,667 B1 * | 4/2005 | Synnestvedt et al. | 370/466 |
| 6,895,443 B2 | 5/2005 | Aiken | |
| 6,952,428 B1 | 10/2005 | Necka et al. | |
| 7,024,484 B2 * | 4/2006 | Alexis | 709/229 |
| 7,054,944 B2 | 5/2006 | Tang et al. | |
| 7,072,337 B1 | 7/2006 | Arutyunov et al. | |
| 7,139,818 B1 * | 11/2006 | Kinnear et al. | 709/222 |
| 7,254,630 B1 | 8/2007 | Daude et al. | |
| 7,315,541 B1 | 1/2008 | Housel et al. | |
| 7,337,224 B1 * | 2/2008 | Van Horne et al. | 709/225 |
| 7,533,255 B1 * | 5/2009 | Dommety et al. | 713/151 |
| 7,568,040 B2 * | 7/2009 | Townsley et al. | 709/230 |
| 7,577,146 B2 | 8/2009 | Arberg et al. | |
| 7,586,912 B2 * | 9/2009 | Agarwal et al. | 370/389 |
| 7,596,614 B2 * | 9/2009 | Saunderson et al. | 709/224 |
| 8,230,067 B2 * | 7/2012 | Arberg et al. | 709/226 |
| 2002/0013858 A1 * | 1/2002 | Anderson | 709/245 |
| 2002/0073182 A1 | 6/2002 | Zakurdaev et al. | |
| 2003/0088700 A1 * | 5/2003 | Aiken | 709/245 |
| 2004/0003126 A1 * | 1/2004 | Boucher et al. | 709/250 |

(Continued)

OTHER PUBLICATIONS

Ports, Circuits, and Tunnels Configuration Guide, SmartEdge OS, Release 6.1.1, Part No. 220-0750-01, Redback Networks, Inc., 1998-2007.

(Continued)

*Primary Examiner* — Andrew Goldberg
(74) *Attorney, Agent, or Firm* — Blakely Sokoloff Taylor & Zafman LLP

(57) ABSTRACT

Methods and apparatuses for providing clientless IP services for subscribers on a network interface that does not require either explicit client subnet configurations or explicit routes from the interface to the client subnets.

25 Claims, 10 Drawing Sheets

(56) References Cited

U.S. PATENT DOCUMENTS

| | | | |
|---|---|---|---|
| 2004/0030745 A1* | 2/2004 | Boucher et al. | 709/203 |
| 2004/0213234 A1* | 10/2004 | Koch et al. | 370/392 |
| 2005/0018681 A1* | 1/2005 | Koch et al. | 370/392 |
| 2005/0097223 A1* | 5/2005 | Shen et al. | 709/245 |
| 2005/0114492 A1* | 5/2005 | Arberg et al. | 709/223 |
| 2007/0203990 A1* | 8/2007 | Townsley et al. | 709/206 |
| 2007/0248085 A1* | 10/2007 | Volpano | 370/389 |
| 2008/0294755 A1* | 11/2008 | Melsen et al. | 709/220 |

OTHER PUBLICATIONS

Clips Configuration, Chapter 7, Overview, Ports, Circuits, and Tunnels Configuration Guide, SmartEdge OS, 1998-2007, pp. 7-1 to 7-14.

Patrick, M. "DHCP Relay Agent Information Option," RFC 3046, Jan. 2001, 14 pp.

Droms, R., "Dynamic Host Configuration Protocol," RFC 2131, Mar. 1997, 45 pp.

\* cited by examiner

Configuration File 510 virtual-router-context CLIPS
    interface to-relay
        ip address 11.1.1.2/24

Virtual-router-context DHCP-CLIPS
    interface loop loopback
        ip address 12.1.1.1/24
    interface i1 multi-bind last-resort
        ip unnumbered loop
        dhcp proxy 512

Port 10/1
    bind interface i1 CLIPS
    service clips dhcp ignore-relay context DHCP-CLIPS > New "ignore relay" command to bind DHCP clients as CLIPS subscribers on interface I1 557

METHODS AND APPARATUSES FOR DYNAMICALLY PROVISIONING A DYNAMIC HOST CONFIGURATION PROTOCOL (DHCP) CLIENT AS A CLIENTLESS INTERNET PROTOCOL SERVICES (CLIPS) SUBSCRIBER ON A LAST-RESORT INTERFACE

FIELD OF THE INVENTION

The invention relates generally to network communications. More particularly, the invention relates to a network element acting as a proxy for a server.

BACKGROUND OF THE INVENTION

In the field of communication, the need for high-speed transmission of data, including video and audio, has continued to increase. Moreover, there has been an increase in the selection of services by which users can connect to a network, such as the Internet. Specifically, Internet Service Providers (ISPs) allow for connectivity to the Internet through different types of connections at different speeds such as lower-speed connections like Plain Old Telephone Service (POTS) at typically 56 kilobits/second or high-speed connections like Integrated Services Digital Network (ISDN), Digital Subscriber Line (DSL) Service, and Cable Modem Service over a Radio Frequency (RF) cable line. Service providers may be any of a company which provides subscribers with an Internet gateway and/or Internet content; a telecommunications company which provides network infrastructure; a company or firm which provides a virtual private network (VPN) connection to its employees; or any network-addressable entity that accepts and executes requests from consumers. It can be a mainframe system, a component, or some other type of software or hardware system that executes service requests. Further, other types of ISPs may enable subscribers to receive different types of media, such as video stream, audio stream, etc.

In a typical network, a network element (e.g., router, bridge, switch, etc.) is a piece of networking equipment, including hardware and software that communicatively interconnects other equipment on the network and supports a wide variety of features to facilitate the management, allocation, and distribution of IP addresses. Typically, a Dynamic Host Configuration Protocol (DHCP) server is responsible for allocating and assigning one or more Internet Protocol (IP) addresses to one or more clients. DHCP provides a mechanism for allocating IP addresses dynamically so that the addresses can be reused. The addresses are dynamically assigned from a pool of addresses maintained on the DHCP server. The DHCP server leases each of the DHCP clients one of the available IP addresses for a specified amount of time. Once the specified time has expired, the client renews the lease or requests a new IP address.

FIG. 1 illustrates a flow diagram showing a network configuration for processing a request for an IP address according to the prior art. In this configuration, a DHCP relay (network element) 101 serves as a relay agent with respect to a DHCP server 102 for one or more DHCP clients 103 and 104. Typically, whenever one of the clients 103 or 104 desires to enter the network, the client 103 or 104 sends a DHCP discovery broadcast to the DHCP relay 101. The DHCP relay 101 then forwards the request to the DHCP server 102. The DHCP 102 returns a response packet in the form of a DHCP offer back to the DHCP relay 101 which in turns forwards the response packet back to clients 103 or 104. When the DHCP relay 101 forwards the DHCP offer packet to clients 103 or 104, the DHCP relay 101 installs an IP-host route and Address Resolution Protocol (ARP) entry for the IP address assigned to the respective client 103/104. The IP-host route is also referred to as the default network gateway address and may be identified by a router ID (RID). The default gateway address indicates to the clients 103/104 the address of the DHCP server 102, which is needed by the client to connect to the network. ARP is an Internet Protocol used for mapping an IP address to a physical address on a local area network (LAN) such as an Ethernet LAN. That is, ARP maps an IP address to a physical machine address (such as a Media Access Control (MAC) address) that is recognized by the local network. Each device on a network has at least two addresses: a media access control (MAC) address and an Internet Protocol (IP) address, A MAC address is the address of the physical network interface card (NIC) inside the device, and never changes for the life of the device. A MAC address may also designate other physical components of a network such as a physical subnet. An IP address, on the other hand, can change if the machine moves to another part of the network or the network uses dynamic addressing such as DHCP. ARP is used to match, or resolve, an IP address to its appropriate MAC address (and vice versa). ARP works by broadcasting a packet to all hosts attached to the LAN. ARP packets contain the IP address the sender is interested in communicating with and the receiver processes the ARP packet and returns the corresponding MAC address.

Throughout this process, each of the clients 103/104 receives everything needed to connect to the network (e.g., a valid IP address assigned to the client and the default network gateway address of the DHCP server 102). As a result, further communication between clients 103/104 and DHCP server 102, such as the DHCP lease renewal and/or release, will take place between clients 103/104 and DHCP server 102 directly without substantially invoking the DHCP relay 101.

In an alternative approach, a network element may behave as a proxy for the DHCP server(s). Such a network element is said to be a DHCP proxy. In a DHCP system, when an IP address is requested from a DHCP server, the server responds by "leasing" the IP address to the DHCP client. Whenever an IP address lease times out, it is said to expire. In the case of an IP address expiration or in anticipation of the expiration, a DHCP client may obtain an IP address "renewal" if the DHCP client wishes to remain connected to the network for a longer period of time. In contrast, if a DHCP client wishes to disconnect from the network before the expiration of the IP address lease, the DHCP client may "release" the IP address back to the DHCP server. A network element acting as a DHCP proxy may facilitate the renewal and release of IP address leases. That is, the network element acting as a proxy aliases for the DHCP server. This allows the network element acting as a DHCP proxy to facilitate the handling of lease renewals and releases, and in many cases, to act as a DHCP proxy for multiple DHCP servers configured to provide redundancy.

FIG. 2 illustrates a data flow diagram showing a network configuration for processing a request for an IP address according to the prior art. In network configuration 200, the network configuration includes a DHCP Proxy (network element) 201 having an interface to serve as a DHCP proxy on behalf of the DHCP servers 202 to provide DHCP services to one or more DHCP clients 203/204. An interface such as the interfaces described herein is used to link physical ports to one or more virtual routers within a network element. The interface defines characteristics about the subscribers utilizing a particular network element port through port-interface binding. However, the virtual routers described herein are used by way of example and not of limitation. The interface can also be used to link physical ports to one or more physical routers. When clients 203/204 request DHCP service, the clients 203/204 send a DHCP discover packet to the DHCP Proxy 201 through their respective subnets. A subnet is, in general, a network that forms part of a larger network connected via a bridge or router and is defined as a portion of a network that shares a common address component. On TCP/IP networks, for example, subnets are defined as all devices whose IP addresses have the same prefix. In FIG. 2, clients 203 are connected to one subnet through DSLAM 209 and clients 204 are connected to another subnet through Ethernet switch 211. A DSLAM (digital subscriber line access multiplexer) is a device which takes a number of ADSL subscriber lines and concentrates these to a single ATM line. Similarly, an Ethernet switch is a device which provides a dedicated point-to-point connection between stations talking to each other. As such, DSLAM 209 and Ethernet switch 211 illustrate different ways of configuring client subnets to connect clients 203/204 to DHCP Proxy 201.

The DHCP Proxy 201 then forwards the DHCP discover packets to the DHCP servers 202 and the DHCP offer and request processes take place via DHCP Proxy 201. When the DHCP servers 202 assign an IP address to one of clients 203/204, one of DHCP servers 202 replies with a DHCP packet, such as a DHCP offer packet, which is received by the DHCP Proxy 201. However, prior to the DHCP Proxy 201 forwarding this DHCP reply packet to the respective client 203/204, DHCP Proxy 201 changes the DHCP IP address in the packet, from the DHCP server's 202 IP address to the DHCP Proxy's 201 TIP address. In addition, DHCP Proxy 201 installs an IP-host route and an ARP entry for the IP address assigned to the respective client 203/204. Through this process, each of the clients 203/204 have a valid IP addresses and know the IP address of the DHCP Proxy 201, therefore, the clients 203/204 now consider the DHCP Proxy 201 as the DHCP server 202. That is, DHCP Proxy 201 is now aliasing for (pretending to be like) DHCP server 202. Subsequently, clients 203/204 may further communicate with the network element 301 as a DHCP server for, among other things, the DHCP renewal or release of IP addresses. Since network element 201 serves as a proxy on behalf of one or more DHCP servers 202 having IP addresses from, for example, 1.1.1.1-1.1.1.5, network element 201 can maintain multiple DHCP servers, some of which may be used as redundant DHCP servers for backup purposes. In addition, since network element 201 knows which subscribers are assigned with the IP address from which DHCP servers, network element 201 may keep track and maintain a lease time of the IP addresses allocated to each subscriber. As a result, when a client releases its IP address back to network element 201 (since the client thinks network element 301 is the DHCP server), network element 201 knows that the IP address has been released and network element 201 does not have to keep listening to the traffic of the release IP address. In addition, where DHCP servers 202 service multiple network elements, a reloaded IP address may be reassigned to another subscriber of another network element.

In yet another alternative approach, a network element is operable to behave as both a DHCP relay agent and a DHCP proxy. FIG. 3 is a block diagram illustrating a network configuration showing alternative methods for processing a request for an IP address according to the prior art. Network configuration 300 includes a network element 301 to communicate with one or more clients 303 and 304. Network element 301 includes a DHCP relay interface 305 for clients 303 for relaying DHCP requests to one of a set of one or more DCHP servers 302 similar to the one shown in FIG. 1. In addition, network element 301 includes a DHCP proxy interface for clients 304 for serving as a DHCP proxy on behalf of the set of DHCP servers 302 similar to the one shown in FIG. 2.

When network element 301 is acting as a DHCP relay, clients 303 communicate (via DHCP relay interface 305 of the network element 301) directly with one of the DHCP servers 302. DHCP server(s) 302, in this example, are located at IP addresses 1.1.1.1-1.1.1.5. After acquiring IP addresses from DHCP servers 302, clients 303 directly communicate with one of the DHCP servers 302 without substantially involving the DHCP relay interface 305 of the network element 201. That is, when the respective clients 303 communicate with one of the DHCP servers 302, the client 303 specifies DHCP server's 302 IP address as its destination IP address (i.e., 1.1.1.1-1.1.1.5) in a communication packet, instead of DHCP relay's 305 interface IP address (2.2.2.254).

When the network element 301 is acting as a DHCP proxy, on the other hand, clients 304 communicate with the DHCP proxy interface 306 of network element 301, which in turn communicates with the DHCP servers 302. In this case, the DHCP proxy interface 306 serves as a proxy of the DHCP servers 302. That is, the DHCP proxy interface 306 acts as a DHCP server on behalf of one of the DHCP servers 302. When clients communicate with the DHCP server, clients 304 will specify a DHCP proxy interface, such as DHCP proxy's 306 interface IP address (e.g., 3.3.3.254) as its destination IP address instead of DHCP server's 302 IP address (e.g., 1.1.1.1-1.1.1.5), because clients 304 consider the DHCP proxy interface 306 as the DHCP server 302 they are communicating with.

FIG. 4A is a block diagram illustrating yet another network configuration according to the prior art having a DHCP relay network element in series with a separate DHCP proxy network element. Network configuration 400 includes DHCP proxy (network element) 401, DHCP Server(s) 402, DHCP relay (network element) 405, DHCP clients on subnets 403 and 404, relay interface I1 444, and logical interface I2 445. DHCP clients on subnets (e.g., 403 and 404) represent subnets with computer(s) or other data processing devices supporting DHCP clients like those in FIGS. 1-3. In network configuration 400, the DHCP relay 405 is positioned between the DHCP proxy 401 and the DHCP clients' 403 and 404 subnets. Such a network topology exists in many networks and must be accounted for by service providers who want to set up clientless IP services (CLIPS) for their subscribers. The basic idea behind CLIPS is to enable services without a Point-to-Point over Ethernet (PPPoE) client having to be installed on the device with the DHCP client. That is, CLIPS does not need to have a Point-to-Point connection between the service provider and the client to provide services to the client. Rather, CLIPS enables service providers to make various services available to clients without having a Point-to-Point connection between the client and the service provider network. CLIPS allows for the capture of the MAC address of a particular physical hardware device in a network, which, as discussed above, is another way to address the physical hardware within the network and is used to distinguish among different computing devices within a network whenever, for example, an IP address is not available. In order to set up CLIPS for clients in the network topology of FIG. 4A, however, the clients' subnets must be explicitly configured on the DHCP proxy 401. Specifically, in order to enable CLIPS for the DHCP clients on subnets 403 and 404 shown in FIG. 4A, there must be both explicit client subnet configurations setup on the DHCP proxy 401 for logical interface I2 445 and explicit route configurations from the relay interface I1 444 to the DHCP client subnets. The explicit configurations required for DHCP clients to connect to a network with the topology of FIG. 4A are contained within a configuration file located on the DHCP proxy 401, such as configuration file 410 shown in FIG. 4B.

FIG. 4B illustrates a prior art configuration file which includes both explicit route configurations from a relay interface to client subnets connected to a logical interface and explicit client subnet configurations on the logical interface. Explicit configuration file 410 is executed within the DHCP proxy 401 and includes both explicit routes to reach the DHCP client subnets using the interface I1 444 (IP address=192.168.1-1) as the next hop and explicit client subnet configurations on the logical interface I2 445. Specifically, in FIG. 4B the explicit route configurations from DHCP relay 405 to client subnets 403 and 404 are the explicit routes to reach subnets IP addresses 10.1.1.1/24 and 20.1.1.1/24 using 192.168.1.1 as a next hop. Similarly, the explicit client subnet configurations are the explicit client subnet configurations on the logical interface I2 445. The clients on subnets 403 and 404 are then provisioned as CLIPS subscribers by binding them together on the input of port 10/1 of DHCP proxy 401. In this way, prior art systems enabled CLIPS for DHCP clients in a network configuration where a DHCP relay is located between the DHCP proxy and the DHCP clients.

BRIEF DESCRIPTION OF THE DRAWINGS

A better understanding of at least certain embodiments of the invention can be obtained from the following detailed description in conjunction with the following drawings, in which:

FIG. 5B illustrates an exemplary configuration file for provisioning a DHCP client as a CLIPS subscriber on a last-resort interface with a DHCP relay located between the DHCP client and a DHCP proxy in the network topology according to one embodiment of the invention.

DETAILED DESCRIPTION

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of embodiments of the present invention.

Figure 1:
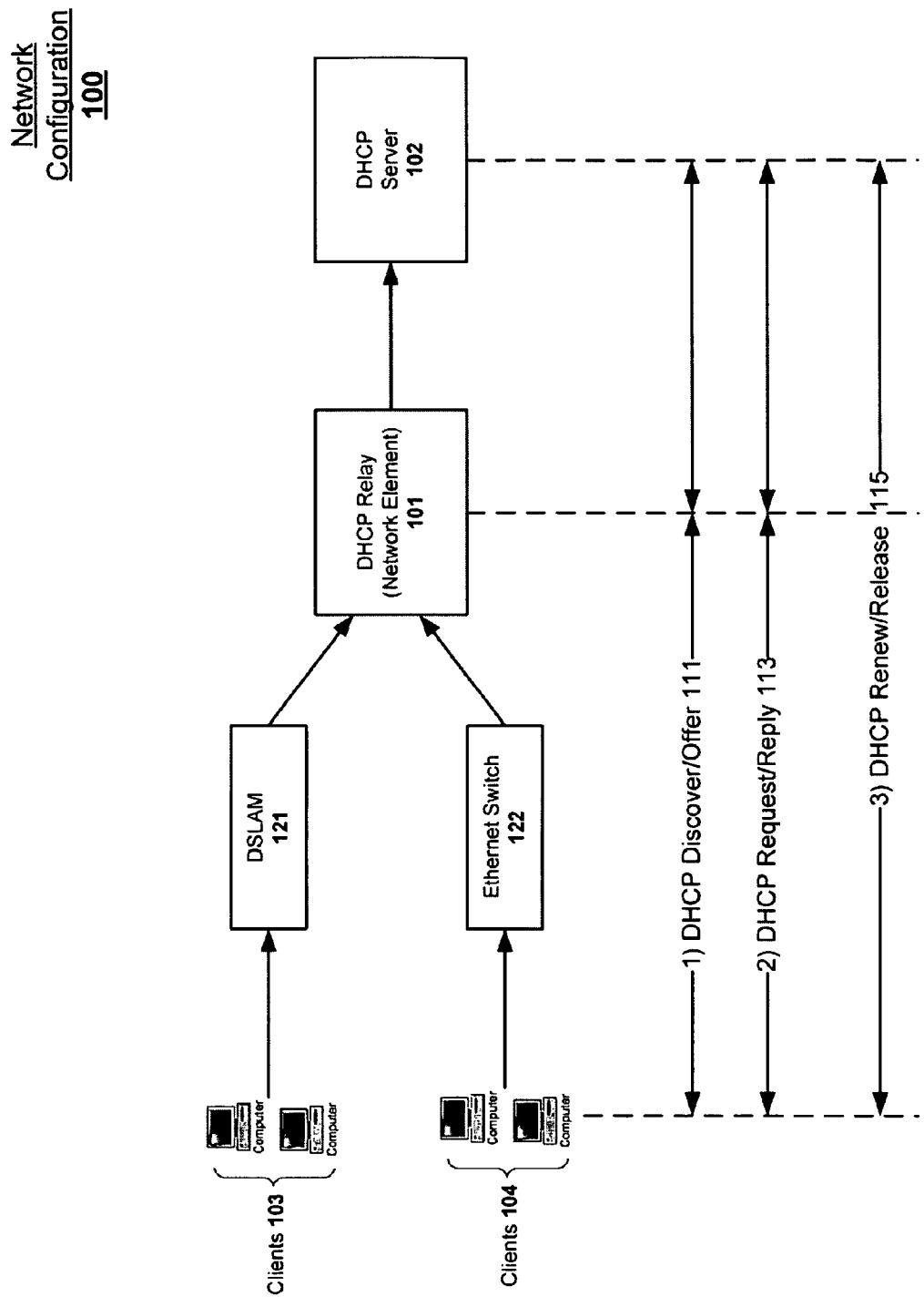
FIG. 1 illustrates a data flow diagram showing a network configuration for processing a request for an Internet Protocol (IP) address according to the prior art.
Figure 2:
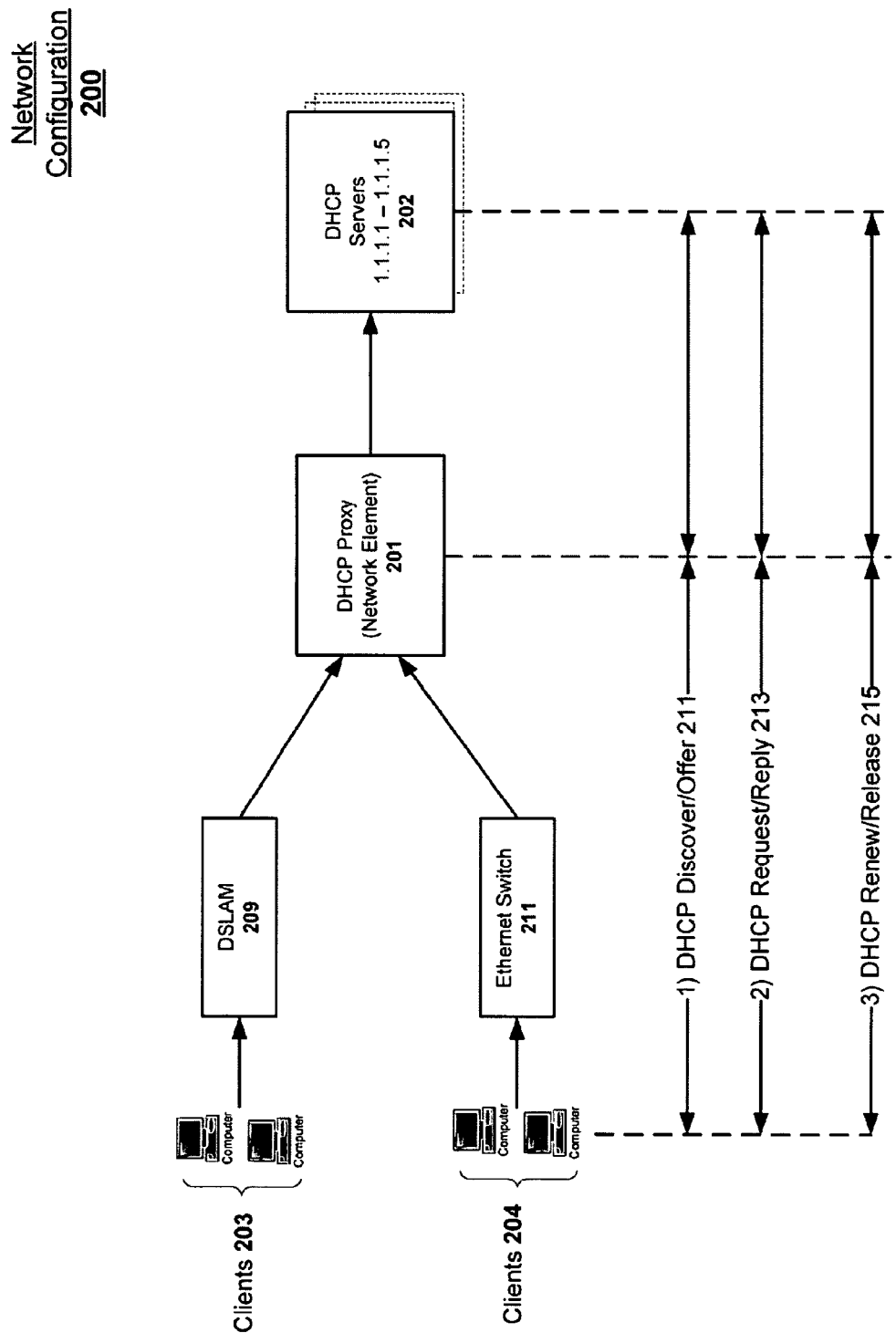
FIG. 2 illustrates a data flow diagram showing a network configuration for processing a request for an IP address according to the prior art.
Figure 3:
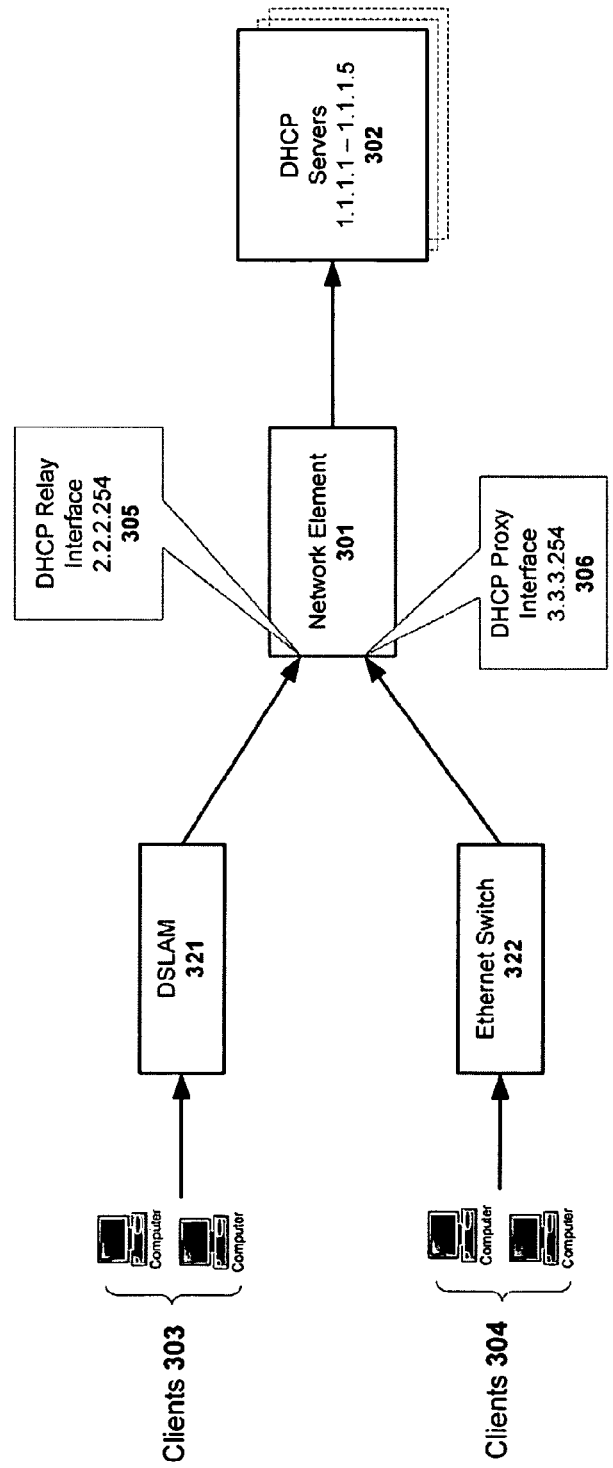
FIG. 3 is a block diagram illustrating a network configuration showing alternative methods for processing a request for an IP address according to the prior art.
Figure 4A:
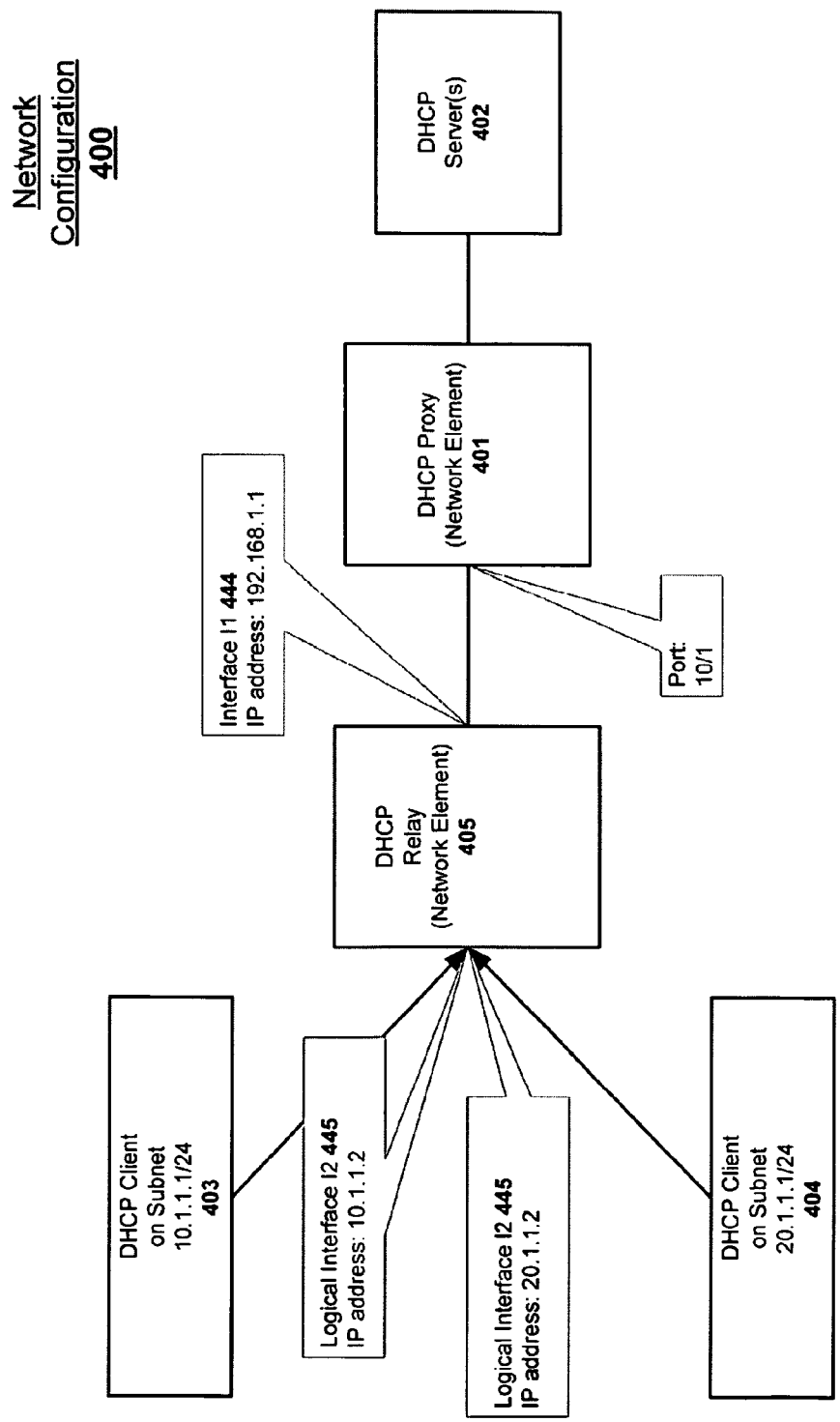
FIG. 4A is a block diagram illustrating a network configuration according to the prior art.
Figure 4B:
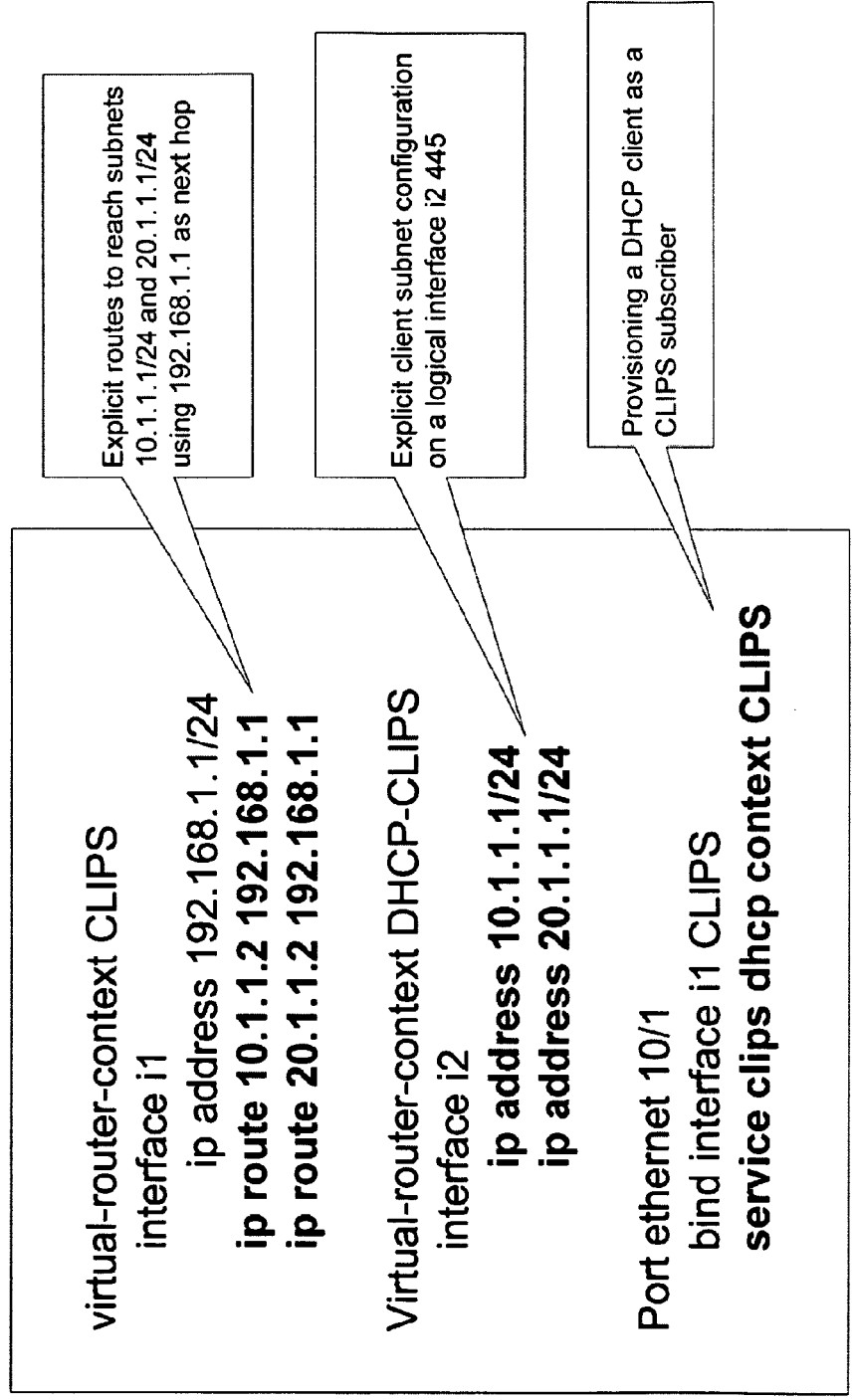
FIG. 4B illustrates a prior art configuration file which includes both explicit route configurations from a relay interface to client subnets connected to a logical interface and explicit client subnet configurations on the logical interface.
Figure 5A:
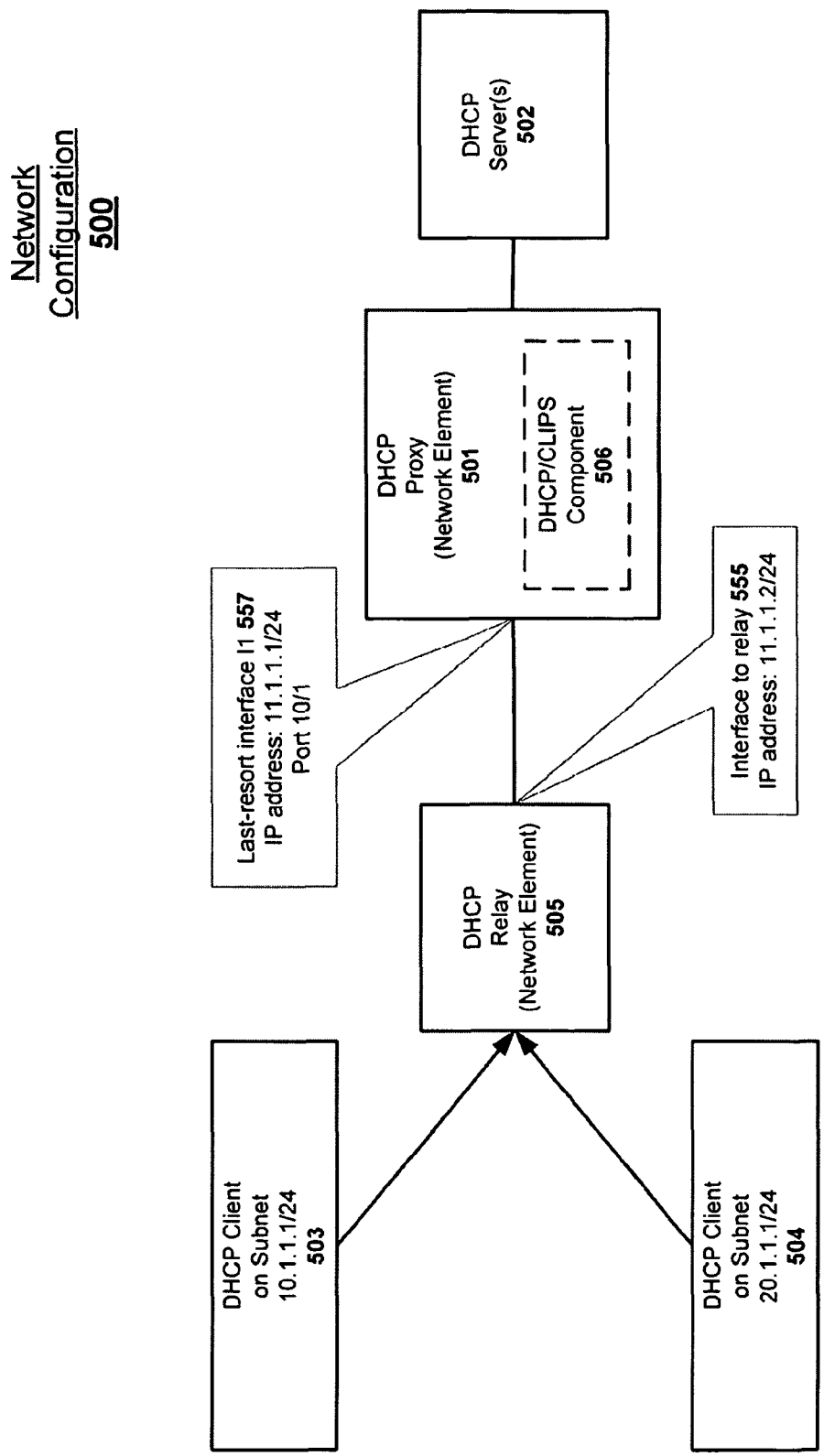
FIG. 5A is a block diagram which illustrates an exemplary network topology upon which the methods of the invention may be implemented.

FIG. 5A is a block diagram which illustrates an exemplary network topology upon which the methods of the invention may be implemented. Network configuration 500 includes DHCP proxy (network element) 501, DHCP server(s) 502, DHCP relay (network element) 505, last-resort interface I1 557, interface to relay 555, and DHCP client subnets 503 and 504. DHCP proxy 501 further includes DHCP/CLIPS component 506. As discussed previously with respect to FIGS. 4A and 4B, the DHCP relay 505 is located between the DHCP proxy 501 and the DHCP client subnets 503/504. However, unlike the situation described with respect to FIGS. 4A and 4B, in at least certain embodiments of the invention, the DHCP proxy 501 may provision the DHCP clients 503/504 as CLIPS subscribers without requiring either explicit route configurations from the relay interface 555 to the clients' 503/504 subnets or explicit client subnet configurations on the logical interface the clients' subnets are connected to. Rather, the interface I1 557 is known as a last-resort interface (or interface of last-resort) that binds all the DHCP clients connected to DHCP relay 505 together as CLIPS subscribers and does not require explicit routes or subnet configurations to be configured on the DHCP proxy 501.

A last-resort interface is a "catch all" interface used to bind subscribers without requiring the service provider(s) to have knowledge of either the explicit configuration of the client subnets or the explicit routes to the client subnets from the interface. This is advantageous because service provider(s) can supply services to clients on a particular interface without having to worry about the details of which DHCP client subnets are configured on the interface. In these embodiments, the DHCP/CLIPS component 506 within the DHCP proxy 501 provides additional functionality to enable CLIPS for DHCP clients on such a last-resort interface where explicit routes and client subnet configurations are not needed. This enables the service provider(s) to supply content and services to the DHCP clients without having to worry about how the clients are configured on the interface. This is further advantageous because in a DHCP environment, IP addresses are obtained dynamically (or on the fly) by the DHCP clients from one or more of the DHCP servers. As a result, since at least certain embodiments do not require explicit routes or subnet configurations, these routes and subnet configurations do not need to be updated each time a DHCP client obtains a different IP address from a DHCP server. The DROP clients can obtain IP addresses through DHCP leases from the DHCP server(s) without having to re-configure the logical interface each time a new IP address lease is obtained.

FIG. 5B illustrates an exemplary configuration file for provisioning a DHCP client as a CLIPS subscriber on a last-resort interface with a DHCP relay located between the DHCP client and a DHCP proxy in the network topology according to one embodiment of the invention. Configuration file 510 includes commands to establish interface I1 as a last-resort interface, such as last-resort I1 557 with IP address 11.1.1.1/24 as shown in FIG. 5A. Configuration file 510 also includes a new command line interface command ("knob") to enable the mechanism according to one embodiment of the invention. The new knob, "ignore-relay," enables the binding of all the DHCP client subnets, such as DHCP clients subnets 503/504, connected to the DHCP relay 505 as CLIPS subscribers to the last-resort interface I1 557. This binding applies for all DHCP packets coming into Port 10/1 of the DHCP proxy 501 of FIG. 5A. All the DHCP discover requests originating from the DHCP client subnets 503 or 504 will be flagged so that the DHCP clients will be provisioned as CLIPS subscribers on the last-resort interface.

In general, there are several fields of information placed within DHCP packets to facilitate routing within a network. DHCP packets may include, among other things, a 'source' field, a "destination" field and a "GI address" field. The source field typically identifies the outlet or egress network interface of a transmitting network element (or server) from which a DHCP packet has been sent. The destination field typically identifies the inlet or ingress network interface of the receiving network element (or server). The GI address field typically identifies the IP address of the particular subnet upon which the corresponding client is connected to. That is, the GI address field typically identifies the client's subnet over which the received DHCP packet was sent. This is done to help a DHCP proxy or server receiving the DHCP packet to assign the correct IP address to the particular client which has to be an IP address on the particular subnet the client is connected to.

Figure 5C:
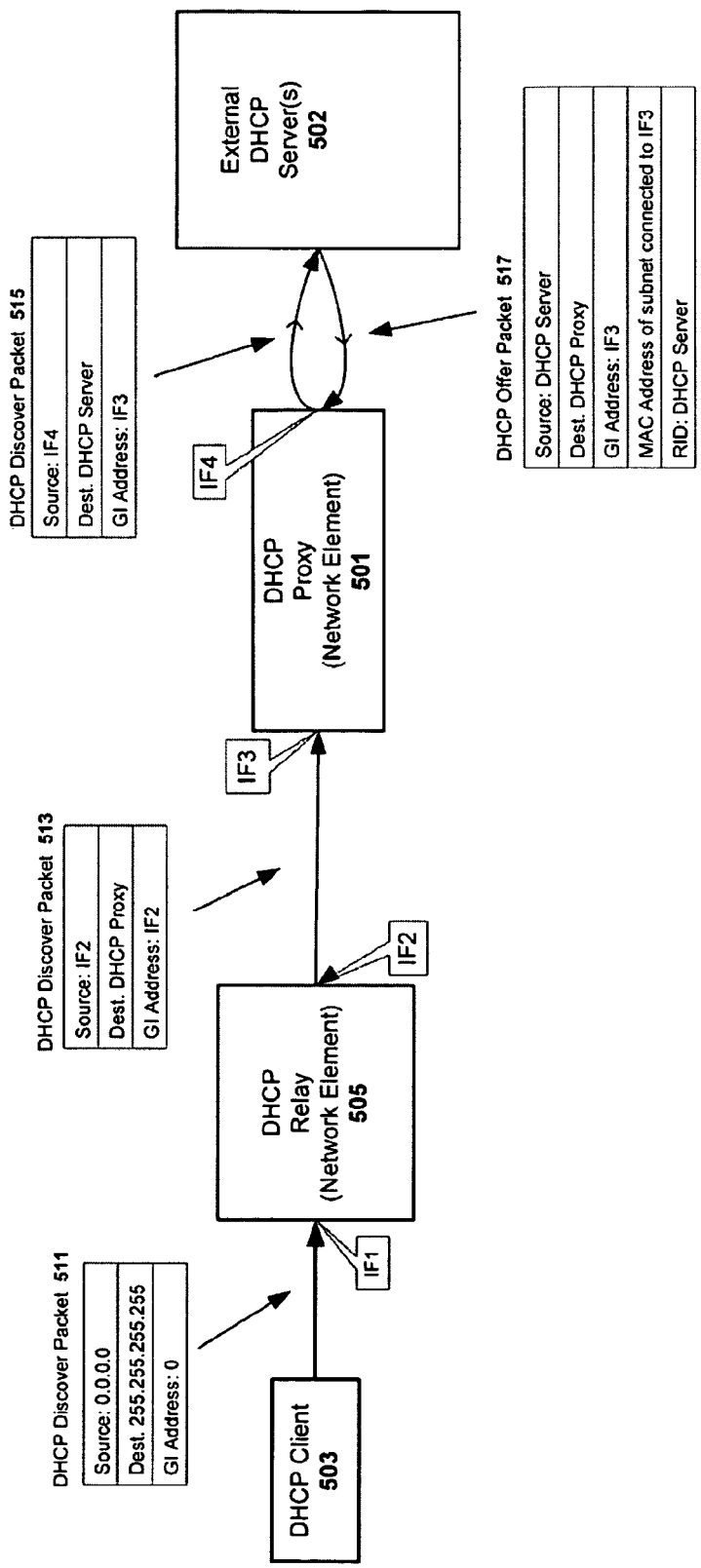
FIG. 5C illustrates a block diagram of an exemplary DHCP process according to one embodiment of the invention.

FIG. 5C illustrates a block diagram of an exemplary DHCP process according to one embodiment of the invention. Exemplary DHCP process 500 may be implemented in exemplary network configuration 500 of FIG. 5A. In the illustrated embodiment, DHCP client 503 sends a broadcast DHCP discover packet 511 into the network. The DHCP discover packet 511 includes, but not limited to, a source IP address within the "source" field (e.g., the IP address of client 403 or 0.0.0.0 since client has not yet obtained an IP address from the DHCP server) and a destination IP address within the "destination" field (i.e., 255.255.255.255 indicating this message is a broadcast message). Since this is a DHCP broadcast message, the "GI address" field is irrelevant, and is therefore set to zero. When the DHCP relay 505 receives DHCP discover packet 511 at its ingress interface IF1, the DHCP relay 505 forwards the discover packet from its egress interface IF2 to the ingress interface IF3 of DHCP proxy 501. Before transmitting the DHCP discover packet to the DHCP proxy 501, the DHCP relay 505 modifies the discover packet (i.e., DHCP discover packet 513). In one embodiment, the DHCP relay 505 replaces the source address of the DHCP discover packet with the DHCP relay's 505 egress interface IF2 IP address and the destination address with the DHCP proxy's 501 ingress interface IF3 IP address. In addition, the DHCP relay 505 sets the GI address field as the DHCP relay's 505 egress interface IF2 IP address. As discussed above, typically the GI address field is used to indicate the client's 503 subnet (i.e., the IP address of interface IF1) so that the correct IP address can be assigned by the DHCP proxy or server. However, in the illustrated embodiment, the DHCP relay 505 includes different characteristics. In at least certain embodiments, the DHCP relay is a wireless base station. In this case, the DHCP 505 relay inserts the DHCP relay's 505 egress IP address within the GI address field of DHCP discover packet 513 instead of the IP address of the client's 503 subnet.

When the DHCP proxy 501 receives DHCP discover packet 513 at the DHCP proxy's 501 ingress interface IF3, the DHCP proxy 501 forwards the DHCP discover packet from the DHCP proxy's 501 egress interface IF4 to the ingress interface of one of the DHCP servers 502. Before transmitting the discover packet to the DHCP server 502, the DHCP proxy 501 modifies the DROP discover packet (i.e., DHCP discover packet 515). In one embodiment, the DHCP proxy replaces the source address of the DHCP discover packet with the DHCP proxy's 501 egress interface IF4 IP address and replaces the destination address with the DHCP server's 502 IP address. In addition, the DHCP proxy 501 sets the GI address field as the DHCP proxy's 501 ingress interface IF3 IP address.

When the DHCP server 502 receives the forwarded broadcast DHCP discover message, the DHCP server 502 returns a DHCP offer message 517 back to the DHCP proxy's ingress interface IF3 via interface IF4. In one embodiment, the DHCP server 502 specifies, in the return DHCP offer packet 517, its IP address as the source address, and the DHCP proxy's 501 egress interface IF4 IP address as the destination address. In addition, the DROP server 502 resolves the IP address within the GI address field of the received DHCP discover packet 515 into a MAC address of the DHCP relay's 505 subnet connected to the DHCP proxy 501 through the DHCP proxy's 501 ingress interface IF3. This is done because the DHCP server 502 assumes that the GI address contained in the received DHCP discover packet 515 indicates the IP address of the client's 503 subnet, and therefore, the DHCP response packet 517 should be sent to the MAC address resolved from the IP address of the client's 503 subnet. However, as discussed above, the GI address field of the DHCP discover packet 515 contains the IP address of the DHCP relay's 505 subnet and not the IP address of the DHCP client's 503 subnet. Therefore, the DHCP server 502 sends the DHCP offer packet 517 to the MAC address corresponding to the DHCP relay's 505 subnet connected to the DHCP proxy's 501 ingress interface IF3.

Additionally, the DHCP server 502 places its own RID into the DHCP offer packet 517. As will be discussed below, the DHCP proxy's 501 ingress interface IF3 may be configured as a last-resort interface. If so, when DHCP proxy 501 receives the DHCP offer packet 517, the DHCP offer packet 517 will be sent to the MAC address corresponding to the DHCP relay's 505 subnet connected to this last-resort interface.

Figure 6A:
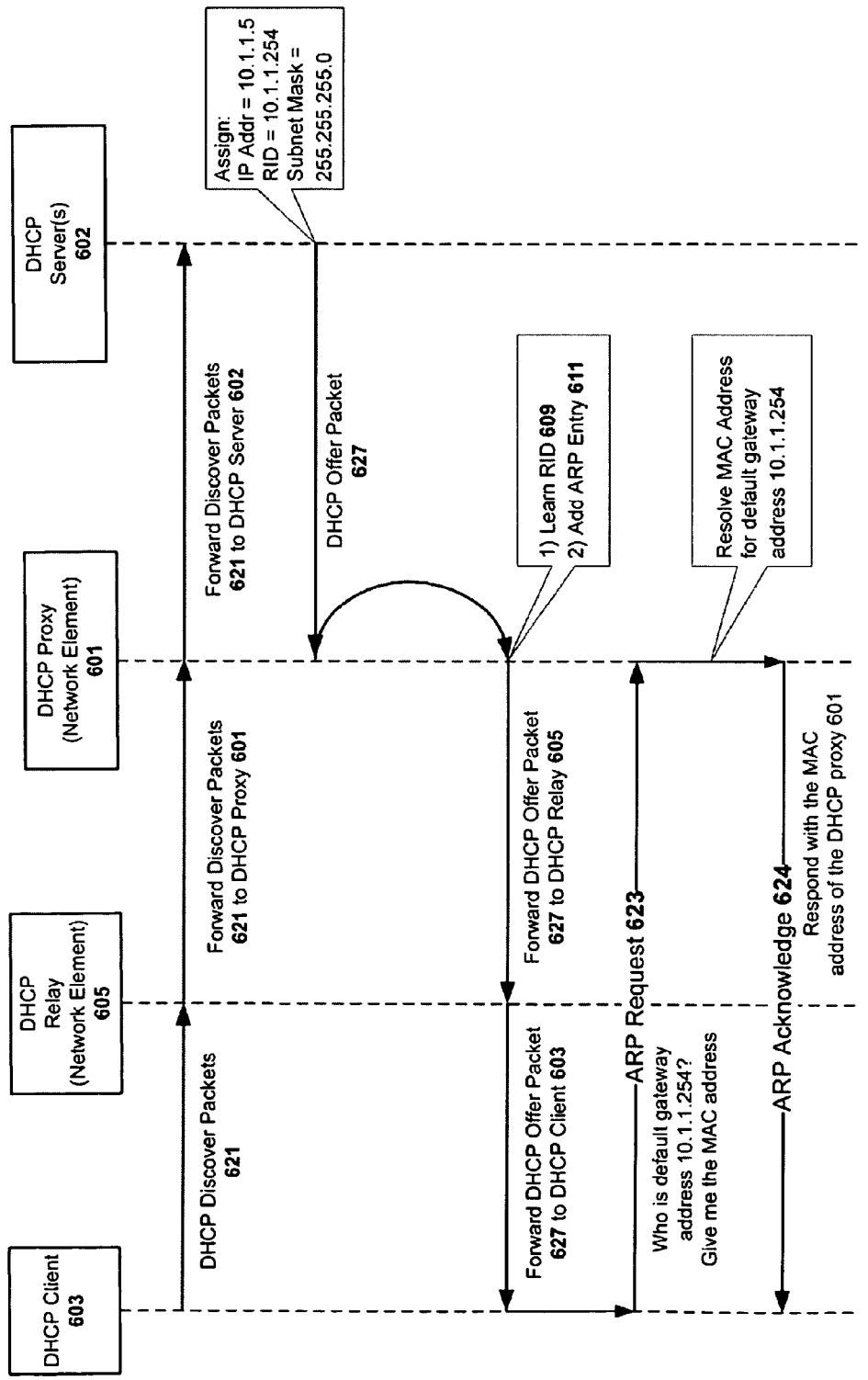
FIG. 6A illustrates an exemplary method of provisioning a DHCP client as a CLIPS subscriber on a last-resort interface according to one embodiment of the invention.

Referring to FIG. 6A, which illustrates an exemplary method of provisioning a DHCP client as a CLIPS subscriber on a last-resort interface according to one embodiment on the invention. Exemplary method 600 may be implemented in exemplary network topology 500 of FIG. 5A. In method 600, DHCP client 603, wanting to obtain an IP address to connect to the network, sends DHCP discover packets 621 through the DHCP client's 603 subnet to the DHCP server(s) 602. In the illustrated embodiment, the DHCP discover packets 621 are intercepted and examined by DHCP relay (network element) 605, which then forwards the DHCP discover packets 621 to DHCP proxy (network element) 601. Prior to the invention, the DHCP proxy 601 was directly connected to the DHCP client subnets, such as the subnet the DHCP client 603 is connected to. As a result, when the DHCP proxy 601 received a DHCP discover packet 621, the DHCP proxy 601 would know exactly upon which subnet the DHCP client 603 was connected. This is because, the DHCP proxy knows which interface a particular DHCP discover packet was received over and also knows that the DHCP client's 603 subnet is directly connected to this interface. So, before the invention the DHCP proxy 601 knew exactly which DHCP client subnet the DHCP proxy 601 was communicating with (proxying for).

In the illustrated configuration, however, there is another network element, the DHCP relay 605, located between the DHCP client's 603 subnet and the DHCP proxy 601. As such, the DHCP proxy 601 is no longer directly connected to the DHCP client's 603 subnet, but rather, to the DHCP relay's 605 subnet such as interface to relay 655 of FIG. 6B (IP address=11.11.21/24). In this configuration, the DHCP proxy 601 receives DHCP discover packets 621 which originated from the DHCP client's 603 subnet, but have been forwarded from the DHCP relay 605. As discussed above with respect to FIG. 5C, the GI address field in this case contains the IP address of the DHCP relay's 605 subnet and not the IP address of the DHCP client's 603 subnet. That is, whenever the DHCP proxy 601 receives the DHCP discover packets 621 originating from a DHCP client's 603 subnet, the GI address field will not indicate the IP address of the DHCP client's 603 subnet, but rather, will indicate the DHCP relay's 605 subnet connected to the DHCP proxy's ingress interface such as ingress interface IF3 of FIG. 5C. Therefore, the DHCP proxy 601 must account for this behavior.

Figure 6B:
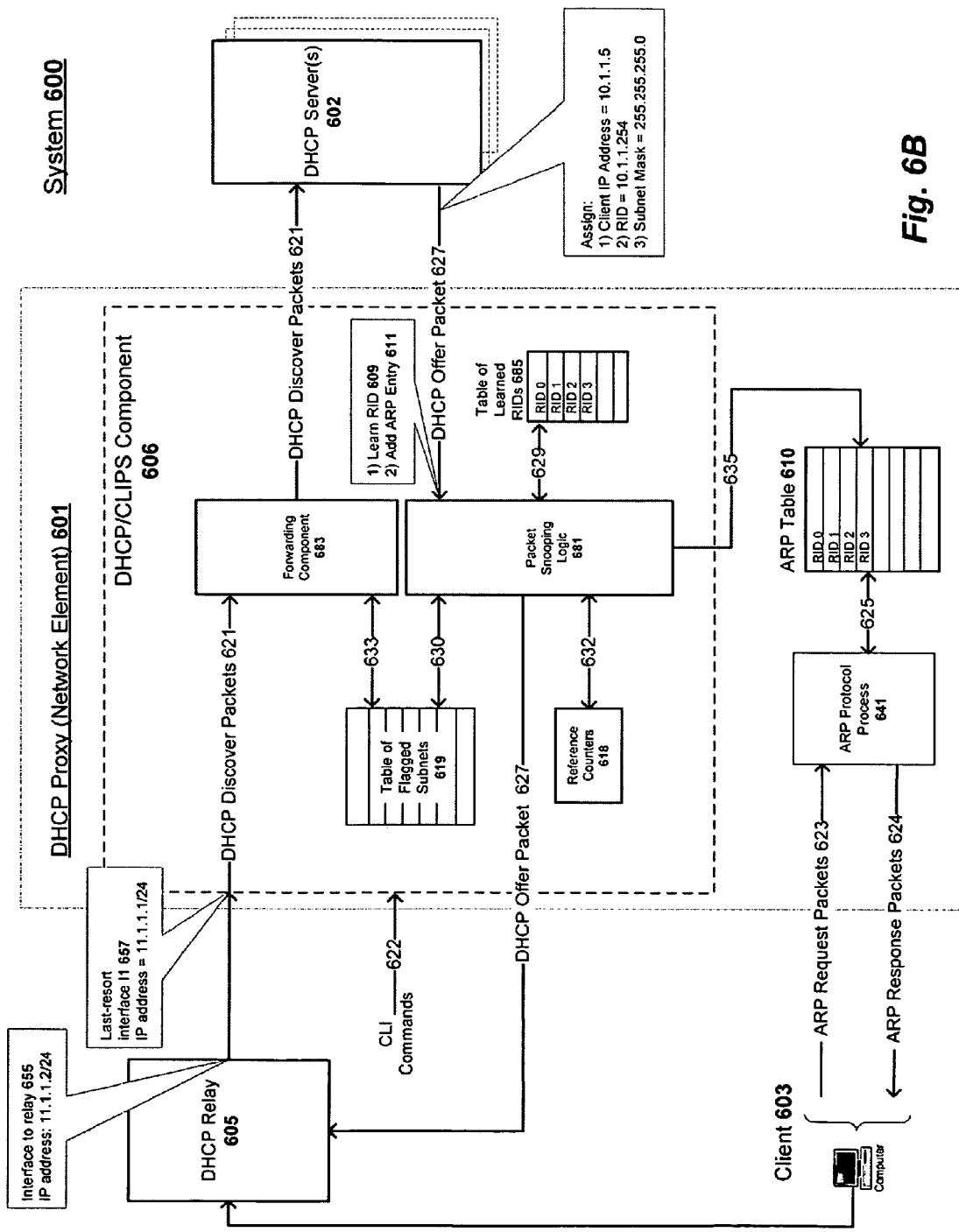
FIG. 6B illustrates a conceptual model of an exemplary system for provisioning a DHCP client as a CLIPS subscriber on a last-resort interface in a network configuration with a DHCP relay network element located between the DHCP proxy network element and the DHCP clients according to one embodiment of the invention.

A last-resort interface (such as last-resort interface I1 657 shown in FIG. 6B) is configured on the DHCP proxy 601 using a set of command line interface (CLI) commands such as CLI commands 622 shown in FIG. 6B. In at least certain embodiments, the CLI commands 622 are entered into a DHCP/CLIPS component of the DHCP proxy, such as DHCP/CLIPS component 606 of a DHCP proxy 601 shown in FIG. 6B. The CLI commands 622 for configuring the last-resort interface I1 657 include the commands shown in configuration file 510 of FIG. 5B. Configuration file 510 includes a new CLI command to bind all the DHCP clients located behind the DHCP relay 605 to a last-resort interface as CLIPS subscribers. This binding applies to the DHCP discover packets 621 coming into the DHCP proxy's 601 ingress interface configured as a last-resort interface, such as ingress interface I1 657 of FIG. 6B. All DHCP discover packets 621 received at the DHCP proxy's 601 ingress interface configured as a last-resort interface will be bound to the ingress interface a CLIPS subscribers. That is, whenever, the DHCP proxy 601 is configured according to configuration file 510 of FIG. 5B using CLI commands 622, every DHCP discover packet 621 coming over the DHCP relay's 505 subnet into the DHCP proxy's ingress interface I1 657 will be bound to the last-resort interface as CLIPS subscribers.

In this embodiment, the DHCP proxy 601 receives on a last-resort interface, such as last-resort interface I1 657 of FIG. 6B, the forwarded DHCP discover packet 621 from the DHCP relay 605. When the particular ingress interface of DHCP proxy 601 is configured as a last-resort interface, the DHCP discover packets 621 received at the DHCP proxy's 601 corresponding ingress interface will be bound to the last-resort interface I1 657. Additionally, whenever the DHCP proxy's 601 ingress interface I1 657 is configured as a last-resort interface using CLI commands 622, the DHCP proxy 601 will flag the DHCP relay's 605 physical subnet connected to the last-resort interface as a CLIPS subnet and store the MAC address of the DHCP relays 605 subnet into a data structure within the DHCP proxy 601, such as the table of flagged subnets 619 shown in FIG. 6B. The MAC address of every subnet connected to the DHCP proxy 601 will already be known by the DHCP proxy 601. This is done so the DHCP proxy 601 will know to snoop the corresponding DHCP offer packets 627 received back from the DHCP server 602 once the server has processed the corresponding DHCP discover packets 627.

After the DHCP discover packet 621 is received at DHCP proxy 601 and the DHCP relay's 605 subnet (i.e., 11.1.1.2/24) is flagged for CLIPS processing, the DHCP proxy 601 forwards the DHCP discover packet 621 to one or more DHCP servers 602. One of DHCP Servers 602 receives the forwarded DHCP discover packet 621 from the DHCP proxy 601 and proceeds to process it. In so doing, the DHCP Server 602, in at least certain embodiments, responds with a DHCP offer packet, such as DHCP offer packet 627 (although illustrated as including only 3 items for simplicity, the DHCP offer packet 627 also includes the other items discussed with reference to DHCP offer packet 517 of FIG. 5C). The DHCP server 602 assigns the following information to be included within the DHCP offer packet 627: 1) an IP address for the DHCP client 603 to connect to the network; 2) a default network gateway address corresponding to a RID; and 3) a subnet mask. The default network gateway address is defined as the IP address within a network that will be used as a "gateway" to access other networks not within the local subnet (e.g., the Internet). In this example, the default network gateway address is the IP address of the DHCP server 602 and is assigned using the RID equal to 10.1.254. The IP address assigned to the DHCP client is equal to 10.1.1.5. The IP address is the IP address from the pool of IP addresses maintained on the DHCP server 602 and is assigned directly to the DHCP client 603 using what is known as a DHCP lease. The term lease is used here because the IP address assigned to the DHCP client is only allocated for a certain period of time. A subnet mask is defined as a bit mask that separates the portions of an IP address significant to the network from the portions of the IP address significant to a particular subnet of the network. In this way, a subnet mask is used to determine where the network number in an IP address ends and the node number in an IP address begins. In this embodiment, the "subnet mask" assigned is bit mask equal to 255.255.2550.

Once the DHCP Server 602 performs its processing, the DHCP server 602 sends a DHCP offer packet 627 containing the assigned information back across the network to the DHCP client 603. However, since the GI address field contained within the DHCP discover packet 621 indicates to the DHCP server 602 the DHCP relay's 605 subnet instead of the DHCP client's 603 subnet, the DHCP offer packet 627 is actually sent to the DHCP relay's 605 subnet connected DHCP proxy's 601 ingress interface I1 657 and not the DHCP client's 603 subnet. The DHCP proxy 601 receives the DHCP offer packet 627 and determines whether the DHCP offer packet 627 is associated with a CLIPS subscriber bound to the last-resort interface I1 657. This is determined by checking whether the MAC address of the physical subnet corresponding to the IP address in the GI address field within the DHCP offer packet 627 has been flagged and stored within the table of flagged subnets 619. If not, the DHCP offer packet 627 is processed normally and forwarded to its intended DCHP client. However, if the MAC address within the DHCP offer packet 627 matches the MAC address of one of the flagged subnets in the table of flagged subnets 619, the DHCP offer packet 627 will receive additional processing. In at least certain embodiments, this additional processing includes binding the DHCP client 603 as a CLIPS subscriber on the last-resort interface I1 657. Specifically, the DHCP offer packet 627 will be processed as if the DHCP relay 605 located between the DHCP client 603 and the DHCP proxy 601 was not there.

To do this, in at least certain embodiments, the DHCP proxy 601 snoops the DHCP offer packet 627 and dynamically learns the RID 609. Once the RID is learned, the DHCP proxy 601 stores the learned RID in a data structure such as the table of learned RIDs 685 shown in FIG. 6B. Additionally, an ARP entry 611 corresponding to the learned RID is placed into an ARP table, such as ARP table 610 shown in FIG. 6B. From the learned RID 609, the DHCP proxy 601 adds an entry into the table of learned RIDs 685 across line 629 of FIG. 6B and adds an entry into ARP table 610 across line 635 of FIG. 6B.

That is, for each learned RID, an entry is made into both the table of learned RIDs 685 and ARP table 610. The ARP entries added into the ARP table 610 also include the learned RID so that the DHCP proxy 601 can properly respond to subsequent ARP queries from the DHCP clients such as DHCP client 603. The DHCP proxy 601 then forwards the DHCP offer packet 627 to the DHCP relay 605, which, in turn, forwards the DHCP offer packet 627 to the DHCP client 603.

The DHCP client 603 now has an assigned IP address and the IP address of the default network gateway both of which were added to the DHCP offer packet 627 by the DHCP server 602. Now, whenever the DHCP client 603 needs to know where to send its network traffic it begins by sending ARP request packets, such as ARP request packet 623, to the IP address of the default network gateway. In FIG. 5B, these are conceptually illustrated as being transmitted between the client 603 and the DROP proxy 601, but in fact they travel through the DROP relay 605. As discussed above, an ARP query is used to resolve an IP address to its corresponding MAC address (and vice versa). The ARP request packet 623 from the DHCP client 603 includes a request for a MAC address to connect to the network as a CLIPS subscriber. The DHCP client 603 sends an ARP request to the default gateway address now stored as a RID within the DHCP proxy 601. The DHCP client 603 sends an ARP request to the default gateway address now stored as a RID within the DHCP proxy 601. Since the DHCP proxy 601 has snooped the DHCP offer packet 627 and learned the RID 609, the DHCP proxy 601 may now intercept the ARP request packet 623 from DHCP client 603 and alias for the DHCP server 602 by responding to the DHCP client's 603 ARP queries with its own MAC address (that is, the MAC address of the DHCP proxy 601). As a result, the DHCP client 603 is actually communicating ARP requests with the DROP proxy 601 and not with the DHCP server(s) 602 even though the DHCP client 603 thinks it is communicating with the DHCP server 602.

Since the invention enables CLIPS subscribers on a last-resort interface coming in over a DHCP relay, such as DHCP relay 605, each of the DHCP clients 603 needs to obtain the MAC address corresponding to the default network gateway so that the DHCP client 603 can connect to the network without a dedicated network configuration on the interface. Thus, the ARP request packet 623 may include a request sent to the DHCP server 602 (and intercepted by the DHCP proxy 601) requesting the MAC address of the default network gateway. The ARP request packets 623 include the RID of the DHCP server 602 that was contained within the DHCP offer packet 627 received by the DHCP client 603. The DHCP proxy 601 is then able to intercept the ARP request packets by matching the RID within the ARP request to its respective RID stored in the ARP table. In this case, the response will be sent, not from the DHCP server 602, but from DHCP proxy 601 aliasing as one of the DHCP servers 602. In response to the ARP request packet 623 sent from the DHCP client 603, the DHCP proxy 601 sends an ARP acknowledge packet 624 containing its own MAC address. Client 603 now has all the information required to connect to the network. Method 600 is discussed in further detail with respect to FIG. 6B below.

FIG. 6B illustrates a conceptual model of an exemplary system for provisioning a DHCP client as a CLIPS subscriber on a last-resort interface in a network configuration with a DHCP relay network element located between the DHCP proxy network element and the DHCP clients according to one embodiment of the invention. In the illustrated embodiment, system 600 includes a DHCP proxy (network element) 601, DHCP Server(s) 602, DHCP relay (network element) 605, and one or more DHCP clients 603. DHCP proxy 601 further includes a DHCP/CLIPS component 606, ARP table 610, and ARP protocol process 641. DHCP/CLIPS component 606 includes forwarding component 683, packet snooping logic 681, table of flagged subnets 619, table of learned RIDs 685, and reference counters 618. In system 600 the DHCP/CLIPS component 606 receives DHCP discover packets 621 from the DHCP relay 605 at last-resort interface I1 657. These DHCP discover packets 621 were the packets originally sent by the DHCP client 603 and forwarded by the DHCP relay 605. In at least certain embodiments, the last-resort interface I1 657 of DHCP/CLIPS component 606 within DHCP proxy 601 is configured as a last-resort interface through commands received from one or more users by means of CLI commands 622 discussed above. The CLI may contain, among other things, an instruction for configuring the DHCP proxy 601 to provision DHCP clients such as DHCP client 603 as CLIPS subscribers using the "ignore relay" knob discussed above with respect to configuration file 510 of FIG. 5B.

Whenever the CLI commands 622 are entered into the DHCP/CLIPS component 606 within DHCP proxy 601 using the CLI, the corresponding ingress interface, such as last-resort interface I1 657 (IP address=11.1.1/24), will be configured as a last-resort interface. As a result, the forwarding component 683 of the DHCP/CLIPS component 606 begins to flag the physical subnets over which each of the incoming DHCP discover packets 621 are received. When this occurs, the forwarding component 683 of the DHCP/CLIPS component 606 flags the DHCP relay's 605 physical subnet (with IP address=11.1.1.2/24) so that each of the DHCP discover packets 621 received over this subnet connected to the DHCP proxy's 601 last-resort interface I1 657 will get additional processing. As discussed previously. Once a DHCP discover packet 621 arrives over the last-resort interface I1 657, the DHCP relay's 605 physical subnet is flagged and the MAC address of the subnet is sent over line 633 and stored in the table of flagged subnets 619. Forwarding component 683 then forwards the DHCP the discover packets 621 to at least one of the DHCP Servers 602. The DHCP server 602 performs processing of the DHCP discover packet 621 and, in one embodiment, assigns the following: 1) an IP address for the client to connect to the network; 2) a default network gateway address in the form of a RID; and 3) a subnet mask. In this example, DHCP Server(s) 602 assigns client IP address equal to 10.1.1.5, default gateway address (RID) equal to 10.1.1.254, and subnet mask equal to 255-255-255.0. This information is then forwarded in a DHCP offer packet 627 to the MAC address of the DHCP relay's 605 subnet since the DHCP server 602 thinks the DHCP relay's 605 subnet is the DHCP client's 603 subnet.

The DHCP offer packet 627 is received at packet snooping logic 681 of DHCP/CLIPS component 606. In at least certain embodiments, the packet snooping logic 681 checks the table of flagged subnets 619 over line 630 to determine if the received DHCP offer packet 627 is destined for a flagged subnet. The packet snooping logic 681 determines this by matching the MAC address contained within the DHCP offer packet 627 to one of the MAC addresses contained within the table of flagged subnets 619. If there is no matching MAC address in the table of flagged subnets 619, the packet is forwarded to the appropriate DHCP client without additional processing. However, if the received DHCP offer packet 627 contains a MAC address that matches one of the MAC addresses contained in the table of flagged subnets 619, (i.e., is destined for a flagged subnet), the packet snooping logic 681 knows the DHCP offer packet is destined for a flagged subnet. The packet snooping logic 681 then checks the table of learned RIDs 685 to determine whether the DHCP offer packet 627 contains a new RID 609 that must be learned, or whether the DHCP offer packet 627 contains a RID 609 that has already been learned. If packet snooping logic 681 determines the RID 609 has already been learned, the packet snooping logic 681 does not add a new entry to table of learned RIDs 685 via line 629 nor does it add a new entry to the ARP table 610 via line 635. The packet snooping logic 681, in this case, just forwards the DHCP offer packet 627 to the DHCP relay 605 without any further action. If, on the other hand, packet snooping logic 681 determines the DHCP offer packet 627 contains an unlearned RID 609 over a flagged subnet, the DHCP packet snooping logic 681 learns the RID 609, adds the learned RID 609 to the table of learned RIDs 685 via line 29, and adds an ARP entry 611 into the ARP table 610 via line 635. As discussed above, the ARP entry includes the learned RID so that the DHCP proxy 601 can respond to ARP queries from the DHCP client 603.

Additionally, in one embodiment of the invention, for each learned RID 609, reference counters 618 are maintained. Whenever a new RID 609 is learned, reference counters 618 are incremented by one. Each successive time a DHCP offer packet 627 is snooped containing the same RID 609, packet snooping logic 681 increments the reference counters 618 over line 632. That is, whenever a new DHCP client 603 requests a new IP address lease from the DHCP server's 602 pool of IP addresses, the reference counters 618 for the associated RID 609 is incremented by one. Likewise, whenever a leased IP address expires or is expressly released by the DHCP client 603 back into the DHCP servers 602 pool of addresses, packet snooping logic 681 decrements the reference counters 618 by one over line 632. In this way, reference counters 618 maintain the number of IP address leases that are currently active for a particular RID 609. The learned RIDs are stored within a table of learned RIDs 685 and entered into the ARP table 610. Each of the RIDs within the table of learned RIDs 685 is removed from the table of learned RIDs 685 whenever the reference count for that RID goes to zero. Likewise, each of the ARP entries within the ARP table 610 is removed from the ARP table 610 when the reference count for that RID goes to zero. At that time, the reference counters 618 have been decremented to zero indicating there are no longer any leases of IP addresses for DHCP clients on that particular subnet. Accordingly, there is no reason to maintain the RID 609 for the particular client subnet within the table of learned RIDs 685. If that particular DHCP client subnet includes a DHCP client that makes a later request for an IP address through another DHCP discover packet 621, the RID will likely need to be learned once again by DHCP proxy 601 at that time since a different DHCP server of the DHCP servers 602 may handle a subsequent DHCP discover request.

Once the new RID 609 for the particular client's 603 subnet is learned, it will be placed into the table of learned RIDs 685 over line 629 as before and the method iterates. That is, whenever a DHCP client 603 on a particular DHCP client subnet is the first DHCP client 603 to request to connect to the network as a CLIPS subscriber by dynamically obtaining an IP address from a DHCP server 602, the associated RID 609 contained in the DHCP offer packet 627 must be learned and placed within the table learned RIDs 685. Subsequent accesses (via DHCP IP address leases) to the network, using DHCP discover packets 621 from a DHCP client 603 on the same DHCP client subnet, will not cause a new entry in the table of learned RIDs 685, but rather, will only cause packet snooping logic 681 to increment reference counters 618 over line 632. Likewise, subsequent DHCP IP address release or expiration, using DHCP discover packets 621 from a DHCP client 603 on the same DHCP client subnet will only cause packet snooping logic 681 to decrement reference counters 618 over line 632.

However, the invention is not limited to tracking IP address leases using counters. In alternative embodiments, the number of IP address leases that are currently active may be tracked using other methods known in the art.

Once the processing of the DHCP offer packet 627 is complete, the DHCP offer packet 627 is forwarded back to DHCP relay 605 where it is forwarded again to the DHCP client 603. The DHCP client 603, receiving the DHCP offer packet 627, is now able to send and receive packets over the network. Specifically, client 603 is operable to send ARP request packets 623 to the ARP protocol process 641 within the DHCP proxy 601, ARP protocol process 641 then checks the ARP table 610 over line 625 to determine if there is an ARP entry corresponding to the ARP request packet 623 sent by the DHCP client 603. If so, the ARP protocol process 641 will resolves the IP address into a MAC address for the DHCP proxy 601. The DHCP proxy 601 then responds with the DHCP proxy's 601 own MAC address, in the form of an ARP response packet 624, to DHCP client 603. The DHCP proxy 601, having the necessary information to alias for the DHCP Server(s) 602, can now respond to all ARP queries from the DHCP client 603 with its own MAC address. Thus, the DHCP proxy 601 becomes the de facto default network gateway and as far as the DHCP client 603 is concerned, the DHCP proxy 601 is the DHCP server 602.

As a result of the above, DHCP clients no longer need to be explicitly configured on a network interface having a DHCP relay network element in series with a separate DHCP proxy network element. Rather, a DHCP client may now be dynamically provisioned as a CLIPS subscriber on a last-resort interface. A system such as the one described, is operable to dynamically enable CLIPS for DHCP clients without explicit configurations and routes being placed on the interface. A router or other network element can provide DHCP proxy functionality in a network topology where the DHCP clients' subnets are not directly connected to the DHCP proxy. That is, the DHCP proxy can provision DHCP clients as CLIPS subscribers in the network topology illustrated in FIGS. 4A, 5A and 6B where a DHCP relay device, that acts as an L2 device for data traffic, but acts as a L3 device for DHCP packets, is located between the DHCP proxy and the DHCP clients' subnets. In other words, even though the DHCP clients are CLIPS subscribers sitting behind a DHCP relay device, the DHCP proxy is able to treat them as directly connected (as if there was no DHCP relay in between) for DHCP data packets, and sets up the traffic path that way. But, for the DHCP packets, the DHCP relay is recognized to be present and the packets are sent to it.

Additionally, the default network gateway for the DHCP server is dynamically learned from the RID obtained from the DHCP server, and an ARP entry is added to the DHCP proxy so that it can respond to ARP request from a DHCP client with its own MAC address, effectively becoming the de facto default network gateway for the DHCP clients. The default network gateway entry (RID) is learned by the DHCP proxy and added to tables within the DHCP proxy for every new RID observed, and is deleted when the last of the DHCP clients using that particular RID discontinues use. Customers using the DHCP proxy can enable DHCP clients as CLIPS subscribers without knowing the particular subnet that the clients belong to. By using the last-resort interface, a network service provider neither has to manage client subnets on the DHCP proxy's interface nor manage the routes that might be configured for the subscribers. In contrast to the prior art in which this information must be statically configured, the default gateway information is dynamically learned from the DHCP server even though the RID may continue to change. In this way, a system is able to dynamically learn what network default gateway it needs to pretend to be like and alias for that gateway for all DHCP discover packets sent from DHCP clients on a particular client subnet. In this way, every time a DHCP server allocates a different range of addresses for DHCP clients on a particular subnet, there is no need to go back and reconfigure the static configuration on the DHCP proxy's interface in order to process DHCP packets, which obviates the need for user intervention and resources.

Finally, unlike prior art systems in which the DHCP relay intercepts and examines DHCP packets, but not ARP packets (since the DHCP relay is an L2 switch and ARP packets just pass through without being properly processed); dynamically provisioning a DCHP client as CLIPS subscriber on a last-resort interface allows for both intercepting and examining ARP packets. The ARP packets are accounted for using ARP entries that are obtained by snooping the DHCP offer packets and learning the default network gateway address of the DHCP server. Accordingly, the DHCP proxy aliasing as a DHCP server is enabled to respond to a DHCP client's ARP queries.

Throughout the foregoing specification, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. When a particular feature, structure, or characteristic is described in connection with an embodiment, it is submitted that it is within the knowledge of one skilled in the art to effect such a feature, structure, or characteristic in connection with other embodiments whether or not explicitly described. Various changes may be made in the structure and embodiments shown herein without departing from the principles of the invention. Further, features of the embodiments shown in various figures may be employed in combination with embodiments shown in other figures.

In the description as set forth above and claims, the terms "coupled" and "connected," along with their derivatives, may be used. It should be understood that these terms are not intended to be synonymous with each other. Rather, in particular embodiments, "connected" is used to indicate that two or more elements are in direct physical or electrical contact with each other. "Coupled" may mean that two or more elements are in direct physical or electrical contact. However, "coupled" may also mean that two or more elements are not in direct contact with each others but yet still cooperate or interact with each other.

Some portions of the foregoing detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion as set forth above, it is appreciated that throughout the foregoing description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to apparatus for performing the operations herein. This apparatus may be specially constructed for the required purposes, or it may comprise a general purpose computer selectively activated or reconfigured by a computer program stored in the computer. Such a computer program may be stored or transmitted in a machine-readable medium, such as, but is not limited to, a machine-readable storage medium (e.g., any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions), or a machine-readable transmission medium such as, but not limited to, any type of electrical, optical, acoustical or other form of propagated signals (e.g., carrier waves, infrared signals, digital signals, etc.).

The algorithms and displays presented herein are not inherently related to any particular computer system or other apparatus. Various general purpose systems may be used with programs in accordance with the teachings herein, or it may prove convenient to construct more specialized apparatuses to perform the method operations. The structure for a variety of these systems appears from the description above. In addition, the invention is not described with reference to any particular programming language. It will be appreciated that a variety of programming languages may be used to implement the teachings of the invention as described herein.

Embodiments of the invention may include various operations as set forth above or fewer operations or more operations or operations in an order which is different from the order described herein. The operations may be embodied in machine-executable instructions which cause a general-purpose or special-purpose processor to perform certain operations. Alternatively, these operations may be performed by specific hardware components that contain hardwired logic for performing the operations, or by any combination of programmed computer components and custom hardware components.

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow as well as the legal equivalents thereof.

What is claimed is:

1. A method in a network element to enable clientless IP services (CLIPS) for a Dynamic Host Configuration Protocol (DHCP) client on a last-resort interface comprising:
receiving, over a network, on the last-resort interface of the network element a request packet containing a request for an IP address, the request packet originating from the DHCP client, wherein the request packet passes through a DHCP relay located between the network element and one or more DHCP client subnets, wherein the request packet includes a GI address field having an IP address of an interface of the DHCP relay, and wherein the interface of the DHCP relay is at located within the DHCP relay;
in response to the request packet, on behalf of the DHCP client, forwarding a modified request packet to a set of one or more DHCP servers, the modified request packet including an IP address of the last-resort interface in the GI address field;
receiving a response packet forwarded from one of the DHCP servers of the set of DHCP servers, the response packet at least including an IP address to be allocated to the DHCP client, a default network gateway address of the DHCP server, and a gateway IP (GI) address field having the IP address of the last-resort interface;
processing the received response packet by-passing the DHCP relay located between the DHCP client and the network element;
responding to the DHCP client with respect to the request packet as if the network element is an IP address provider, on behalf of the DHCP server;
intercepting an Address Resolution Protocol (ARP) request originated from the DHCP client and destined for the DHCP server that requests a Media Access Control (MAC) address corresponding with the default network gateway address of the DHCP server; and
communicating to the DHCP client, in response to intercepting the ARP request, an ARP acknowledgement packet that includes a MAC address of the network element;
checking a learned router identification (RID) data structure to determine whether the learned RID was previously learned, the previously learned RID having been previously placed within a learned RID data structure; and
if the learned RID is not already located within the learned RIDs data structure:
placing the learned RID into the learned RIDs data structure to enable the network element to alias for the DHCP server; and
placing the learned RID into an Address Resolution Protocol (ARP) data structure to enable the network element to respond to ARP queries from the DHCP client, the ARP queries required for the DHCP client to obtain a MAC address to enable clientless IP services on the last-resort interface.

2. The method of claim 1, further comprising;
configuring the last-resort interface on the network element responsive to a set of one or more command-line entries; and
flagging the physical subnet connected to the last-resort interface over which the request packets are received so that CLIPS processing can be performed on the response packets forwarded from the DHCP server over the same flagged subnet.

3. The method of claim 2, wherein the flagging includes storing a Media Access Control (MAC) address of the physical subnet over which the request packet is received into a flagged subnets data structure.

4. The method of claim 2, further comprising:
in response to receiving the response packet, determining that the response packet is to receive CLIPS processing by matching a MAC address contained within the response packet to the MAC address stored within the data structure; and
snooping the received response packet to learn the default network gateway address if the response packet includes a MAC address of one of the flagged subnet.

5. The method of claim 4, wherein the default network gateway address is a router identification (RID) of the DHCP server.

6. The method of claim 1, wherein the range of addresses is within a pool of addresses maintained at each DHCP server of the set of DHCP servers, and wherein each DHCP server allocates IP addresses dynamically from the pool of addresses through the use of IP address leases.

7. The method of claim 6, further comprising:
incrementing a reference counter each time a successive DHCP response packet contains a request for an IP address lease corresponding to a previously learned RID stored within the learned RIDs data structure; and
decrementing the reference counter each time the IP address lease corresponding to a previously learned RID stored within the learned RIDs data structure expires or is released by one of the DHCP clients back into the DHCP server's pool of addresses.

8. The method of claim 7, wherein the DHCP client requires the IP address to be dynamically allocated by the DHCP server each time the DHCP client connects to the network because the DHCP client does not have the IP address statically configured on the last-resort interface.

9. The method of claim 8, further comprising removing the learned RID entries from the both the learned RIDs data structure and the ARP data structure whenever the reference counter corresponding to the learned RID decreases to zero indicating that all the address leases for that particular learned RID have expired or have been released.

10. The method of claim 9, wherein the last-resort interface is connected to the DHCP relay side of the DHCP network element, the last-resort interface to bind multiple DHCP client subnets to a single interface without having the DHCP client subnets explicitly configured on the interface.

11. A non-transitory computer-readable storage medium implemented in computer hardware that provides instructions, which when executed by a computer, cause the computer to perform a method in a network element to enable clientless IP services (CLIPS) for a Dynamic Host Configuration Protocol (DHCP) client on a last-resort interface comprising:
receiving, over a network, on the last-resort interface of the network element a request packet containing a request for an IP address, the request packet originating from the DHCP client, wherein the request packet passes through a DHCP relay located between the network element and one or more DHCP client subnets, wherein the request packet includes a gateway IP (GI) address field having an IP address of an interface of the DHCP relay, and wherein the interface of the DHCP relay is located within the DHCP relay;

in response to the request packet, on behalf of the DHCP client, forwarding a modified request packet to a set of one or more DHCP servers, the modified request packet including an IP address of the last-resort interface in the GI address field;

receiving a response packet forwarded from one of the DHCP servers of the set of DHCP servers, the response packet at least including an IP address to be allocated to the DHCP client, a default network gateway address of the DHCP server, and a GI address field having the IP address of the last-resort interface;

processing the received response packet by-passing the DHCP relay located between the DHCP client and the network element;

responding to the DHCP client with respect to the request packet as if the network element is an IP address provider, on behalf of the DHCP server;

intercepting an Address Resolution Protocol (ARP) request originated from the DHCP client and destined for the DHCP server that requests a Media Access Control (MAC) address corresponding with the default network gateway address of the DHCP server; and communicating to the DHCP client, in response to intercepting the ARP request, an ARP acknowledgement packet that includes a MAC address of the network element;

checking a learned router identification (RID) data structure to determine whether the learned RID was previously learned, the previously learned RID having been previously placed within a learned RID data structure; and if the learned RID is not already located within the learned RIDs data structure:

placing the learned RID into the learned RIDs data structure to enable the network element to alias for the DHCP server; and placing the learned RID into an Address Resolution Protocol (ARP) data structure to enable the network element to respond to ARP queries from the DHCP client, the ARP queries required for the DHCP client to obtain a MAC address to enable clientless IP services on the last-resort interface.

12. The non-transitory computer-readable storage medium of claim 11, further comprising:

configuring the last-resort interface on the network element responsive to a set of one or more command-line entries; and flagging the physical subnet connected to the last-resort interface over which the request packets are received so that CLIPS processing can be performed on the response packets forwarded from the DHCP server over the same flagged subnet.

13. The non-transitory computer-readable storage medium of claim 12, wherein the flagging includes storing a Media Access Control (MAC) address of the physical subnet over which the request packet is received into a flagged subnets data structure.

14. The non-transitory computer-readable storage medium of claim 12, further comprising:

in response to receiving the response packet, determining that the response packet is to receive CLIPS processing by matching a MAC address contained within the response packet to the MAC address stored within the data structure; and snooping the received response packet to learn the default network gateway address if the response packet includes a MAC address of one of the flagged subnet.

15. The non-transitory computer-readable storage medium of claim 14, wherein the default network gateway address is a router identification (RID) of the DHCP server.

16. The non-transitory computer-readable storage medium of claim 11, wherein the range of addresses is within a pool of addresses maintained at each DHCP server of the set of DHCP servers, and wherein each DHCP server allocates IP addresses dynamically from the pool of addresses through the use of IP address leases.

17. The non-transitory computer-readable storage medium of claim 16, further comprising:

incrementing a reference counter each time a successive DHCP response packet contains a request for an IP address lease corresponding to a previously learned RID stored within the learned RIDs data structure; and decrementing the reference counter each time the IP address lease corresponding to a previously learned RID stored within the learned RIDs data structure expires or is released by one of the DHCP clients back into the DHCP server's pool of addresses.

18. The non-transitory computer-readable storage medium of claim 17, wherein the DHCP client requires the IP address to be dynamically allocated by the DHCP server each time the DHCP client connects to the network because the DHCP client does not have the IP address statically configured on the last-resort interface.

19. The non-transitory computer-readable storage medium of claim 18, further comprising removing the learned RID entries from the both the learned RIDs data structure and the ARP data structure whenever the reference counter corresponding to the learned RID decreases to zero indicating that all the address leases for that particular learned RID have expired or have been released.

20. The non-transitory computer-readable storage medium of claim 19, wherein the last-resort interface is connected to the DHCP relay side of the DHCP network element, the last-resort interface to bind multiple DHCP client subnets to a single interface without having the DHCP client subnets explicitly configured on the interface.

21. An apparatus comprising:

a network element, coupled between a Dynamic Host Configuration Protocol (DHCP) relay and a set of one or more DHCP servers, to act as a DHCP proxy on behalf of the set of DHCP servers and to provide clientless IP services (CLIPS) to a plurality of DHCP clients coupled to the DHCP relay, the network element including, a port coupled to the DHCP relay, the port including an interface configured as a last-resort interface for CLIPS subscribers;

a forwarding component coupled to said port to receive over the last-resort interface requests for IP addresses originating from the DHCP clients, the requests including a gateway IP (GI) address field having an IP address of an interface of the DHCP relay, wherein the interface of the DHCP relay is at located within the DHCP relay, and to forward modified requests to the set of DHCP servers, the modified requests including an IP address of the last-resort interface in the GI address field;

a snoop component to receive response packets forwarded from the set of DHCP servers responsive to said requests, to process the received response packets as if by-passing the DHCP relay is not located between the DHCP client and the network element including snoop the response packets to learn a default network gateway address of the responding ones of the set of DHCP servers, and to respond to the respective DHCP clients as if the network element is an IP address provider, on behalf of the set of DHCP servers; and an Address Resolution Protocol (ARP) process to:

intercept ARP requests originated from the DHCP clients and destined for the set of DHCP servers that each request a Media Access Control (MAC) address corresponding with one of the default network gateway addresses of the responding ones of the set of DHCP servers, and responsive to each intercepted ARP request, communicate an ARP acknowledgement packet that includes a MAC address of the network element to that DHCP client that originated that intercepted ARP request;

a learned router identification (RID) data structure to store previously learned RIDs; and an Address Resolution Protocol (ARP) data structure coupled to the snoop component and the ARP process to store ARP entries corresponding to the previously learned RIDs.

22. The apparatus of claim 21, further comprising;

a command-line interface to configure the last-resort interface on the network element responsive to a set of one or more command-line entries; and a flagged subnets data structure to flag each physical subnet connected to the last-resort interface over which the request packets are received.

23. The apparatus of claim 22, wherein a Media Access Control (MAC) address of each physical subnet coupled to the last-resort interface is stored into the flagged subnets data structure, wherein the snooping logic is further to determine the response packet are to receive CLIPS processing by matching the MAC addresses within the response packet to the MAC address stored within the data structure.

24. The apparatus of claim 23, wherein the default network gateway address is a router identification (RID) of the DHCP server.

25. The apparatus of claim 21, further comprising reference counters coupled to the snoop component to track IP address leases currently maintained by the network element.

* * * * *

UNITED STATES PATENT AND TRADEMARK OFFICE
CERTIFICATE OF CORRECTION

PATENT NO.         : 8,572,217 B2
APPLICATION NO.    : 12/032587
DATED              : October 29, 2013
INVENTOR(S)        : Verma et al.

It is certified that error appears in the above-identified patent and that said Letters Patent is hereby corrected as shown below:

In the Specifications

In Column 1, Line 49, delete "reused." and insert -- re-used. --, therefor.

In Column 2, Line 14, delete "address," and insert -- address. --, therefor.

In Column 3, Line 31, delete "TIP" and insert -- IP --, therefor.

In Column 4, Line 1, delete "DCHP" and insert -- DHCP --, therefor.

In Column 4, Line 10, delete "1.1.1.1-1.1.5." and insert -- 1.1.1.1-1.1.1.5. --, therefor.

In Column 6, Line 58, delete "DROP" and insert -- DHCP --, therefor.

In Column 7, Line 16, delete "'source'" and insert -- "source" --, therefor.

In Column 8, Line 5, delete "DROP" and insert -- DHCP --, therefor.

In Column 8, Line 21, delete "DROP" and insert -- DHCP --, therefor.

In Column 10, Line 26, delete "10.1.254." and insert -- 10.1.1.254. --, therefor.

In Column 10, Line 39, delete "255.255.2550." and insert -- 255.255.255.0. --, therefor.

In Column 10, Line 57, delete "DCHP" and insert -- DHCP --, therefor.

In Column 11, Line 27, delete "FIG. 5B," and insert -- FIG. 6B, --, therefor.

In Column 11, Line 29, delete "DROP proxy" and insert -- DHCP proxy --, therefor.

In Column 11, Line 30, delete "DROP relay" and insert -- DHCP relay --, therefor.

In Column 11, Line 46, delete "DROP" and insert -- DHCP --, therefor.

Signed and Sealed this
Twentieth Day of May, 2014

Michelle K. Lee
*Deputy Director of the United States Patent and Trademark Office*

CERTIFICATE OF CORRECTION (continued)
U.S. Pat. No. 8,572,217 B2

In Column 12, Line 35, delete "(IP address=11.1.1/24)," and insert -- (IP address=11.1.1/24), --, therefor.

In Column 12, Line 45, delete "previously. Once" and insert -- previously, once --, therefor.

In Column 13, Line 42, delete "servers" and insert -- server's --, therefor.

In Column 15, Line 29, delete "DCHP" and insert -- DHCP --, therefor.

In Column 15, Line 63, delete "others" and insert -- other, --, therefor.

In the Claims

In Column 17, Line 23, in Claim 1, delete "at located" and insert -- located --, therefor.

In Column 18, Line 1, in Claim 2, delete "comprising;" and insert -- comprising: --, therefor.

In Column 19, Line 50, in Claim 12, delete "comprising;" and insert -- comprising: --, therefor.

In Column 20, Line 61, in Claim 21, delete "at located" and insert -- located --, therefor.

In Column 22, Line 1, in Claim 22, delete "comprising;" and insert -- comprising: --, therefor.